(12) United States Patent
Malm

(10) Patent No.: US 8,393,506 B2
(45) Date of Patent: Mar. 12, 2013

(54) BICYCLE SUPPORT ASSEMBLY FOR USE WITH A LOAD CARRIER FOR VEHICLES

(75) Inventor: Torbjörn Malm, Jönköping (SE)

(73) Assignee: Thule Sweden AB (SE)

( * ) Notice: Subject to any disclaimer, the term of this patent is extended or adjusted under 35 U.S.C. 154(b) by 310 days.

(21) Appl. No.: 12/743,524

(22) PCT Filed: Nov. 18, 2008

(86) PCT No.: PCT/EP2008/065729
§ 371 (c)(1),
(2), (4) Date: May 18, 2010

(87) PCT Pub. No.: WO2009/065817
PCT Pub. Date: May 28, 2009

(65) Prior Publication Data
US 2010/0288810 A1      Nov. 18, 2010

(30) Foreign Application Priority Data

Nov. 21, 2007    (SE) .................................. 0702579-4

(51) Int. Cl.
| A47B 96/06 | (2006.01) |
| E04G 3/00 | (2006.01) |
| F16B 1/00 | (2006.01) |
| G09F 7/18 | (2006.01) |
| B60R 9/00 | (2006.01) |
| B60R 11/00 | (2006.01) |

(52) U.S. Cl. ........ 224/319; 224/536; 224/324; 224/558; 224/570; 224/924; 248/229.1; 248/229.11; 248/229.12; 248/229.13; 248/229.14

(58) Field of Classification Search ................... 224/319, 224/536, 324, 558, 570, 924; 248/229.1–229.16
See application file for complete search history.

(56) References Cited

U.S. PATENT DOCUMENTS

| 5,282,555 A | 2/1994 | Muir |
| 5,638,706 A * | 6/1997 | Stevens .............................. 70/19 |

(Continued)

FOREIGN PATENT DOCUMENTS

| DE | 9214916 U1 | 12/1993 |
| DE | 202006017800 U1 | 1/2007 |

(Continued)

OTHER PUBLICATIONS

International Search Report, Application No. PCT/EP2008/065729, May 28, 2009, pp. 1-14.

*Primary Examiner* — Nathan J Newhouse
*Assistant Examiner* — Derek Battisti
(74) *Attorney, Agent, or Firm* — Novak Druce Connolly Bove + Quigg LLP

(57) ABSTRACT

The present invention relates to a support assembly (1) for securing a bicycle to a load carrier for vehicles, comprising a bar (2), which is provided at both ends with a gripping means (3, 4) for mounting the support assembly between a substantially fixed frame of the load carrier and the bicycle, a common tensioning means (5), when tightened forcing together said gripping means (3, 4). The main feature of the invention is that a first gripping means (3) for attachment to the frame of the load carrier comprises an openable annular clamp (8), which extends substantially completely around the frame, and an attachment fitting (9) which is fixedly attached to the clamp for attachment to the tensioning means (5), the opening of the clamp (8) being arranged adjacent said attachment fitting (9) and the clamp (8) has two mutually adapted clamping jaws (10, 11), which are arranged on either side of the opening and which upon tightening of the tensioning means (5) are pressed against one another to tighten the clamp (8) together around the frame.

8 Claims, 2 Drawing Sheets

U.S. PATENT DOCUMENTS

| | | | |
|---|---|---|---|
| 5,762,248 A | 6/1998 | Englander | |
| 6,234,372 B1 * | 5/2001 | Rivera | 224/536 |
| 6,296,162 B1 * | 10/2001 | Englander et al. | 224/324 |
| 6,503,019 B1 * | 1/2003 | Wang | 403/109.1 |
| 6,602,015 B1 * | 8/2003 | Evans et al. | 403/109.1 |
| 6,866,175 B2 * | 3/2005 | Munoz et al. | 224/324 |
| 2005/0082328 A1 * | 4/2005 | Lo | 224/499 |
| 2006/0086766 A1 * | 4/2006 | Settelmayer | 224/323 |
| 2006/0157523 A1 * | 7/2006 | Girod et al. | 224/497 |
| 2007/0108245 A1 * | 5/2007 | Ferman et al. | 224/504 |

FOREIGN PATENT DOCUMENTS

| | | |
|---|---|---|
| DE | 202007005704 U1 | 8/2007 |
| WO | 03/106221 A | 12/2003 |
| WO | 2006/004519 A | 1/2006 |

\* cited by examiner

BICYCLE SUPPORT ASSEMBLY FOR USE WITH A LOAD CARRIER FOR VEHICLES

TECHNICAL FIELD

The present invention relates to a support assembly for securing a bicycle to a load carrier for vehicles, comprising a bar which is provided at both ends with a gripping means for mounting the support assembly between a substantially fixed frame of the load carrier and the bicycle, a common tensioning means, when tightened, forcing together said gripping means.

TECHNICAL BACKGROUND

A support assembly for securing a bicycle to a load carrier is previously known from, for example, WO 2006/004519. The support assembly comprises a clamping ring provided at one end of a bar and a claw-shaped gripping means provided at the other end of the bar, which are intended to be mounted between a frame of the load carrier and the bicycle, a common tensioning means in the form of a bolt, which extends through the gripping means, being arranged to force together said gripping means when tightened. By mounting a lockable knob on the bolt, both gripping means can be locked in the tightened position. Although the function of this support assembly, which before tightening is slidable along the frame, has proven satisfactory, the assembly has not afforded sufficient flexibility when using several support assemblies of different length, since it has been difficult to change the places of the support assemblies to accommodate different arrangements of the bicycles on the load carrier. Usually, it has been necessary to dismount the frame in order to change the position of the support assemblies.

Other kinds of support assemblies or spacer means are previously known through, for example, U.S. Pat. No. 5,282,555, which discloses an adjustable arm provided at both ends with a securing strap, or DE G9214916.2, which discloses an arm provided at both ends with a claw-shaped gripping means. A disadvantage of these devices is that they cannot be sufficiently tightened around the frame and do not afford satisfactory protection against theft, since the first device is not lockable and the second features a claw that opens outwards and is quite easily prised open. Furthermore, the spacer means may come loose during transport if the tensioning means was insufficiently tightened.

Problem

The problem with previously known support assemblies is that they cannot be sufficiently tightened around the frame of the load carrier while being at the same time easily movable along the frame. In addition, they do not afford sufficient protection against theft.

Solution to the Problem

The object of the present invention is to provide a support assembly that solves the problems associated with previously known support assemblies.

The present invention overcomes the above stated disadvantages by means of a support assembly of the kind described by way of introduction, which is characterised in that a first gripping means for attachment to the frame of the load carrier comprises an openable annular clamp, which extends substantially completely around the frame, and an attachment fitting which is fixedly attached to the clamp for attachment to the tensioning means, the opening of the clamp being arranged adjacent said attachment fitting, and that that the clamp has two mutually adapted clamping jaws, which are arranged on either side of the opening and which upon tightening of the tensioning means are pressed against one another to tighten the clamp together around the frame.

Suitably, the clamping jaws have at least one lug or the like, which projects from one clamping jaw, and a corresponding recess in the other clamping jaw, the clamping jaws being fixed to one another in the direction along the frame.

Preferably, the clamping jaws project radially from the annular clamp and have a substantially conical outer shape, which is adapted to the cross-section of the bar and intended to be inserted in a corresponding recess in the bar upon tightening of the tensioning means.

Moreover, the annular clamp comprises at least one projecting bead or the like, which is provided on its inner surface, said bead abutting the frame upon tightening of the tensioning means. Preferably, the annular clamp comprises a hinge or the like for allowing opening of the clamp.

BRIEF DESCRIPTION OF THE DRAWINGS

A support assembly according to the present invention will be described below with reference to the accompanying drawings, in which.

PREFERRED EMBODIMENT

Figure 1:
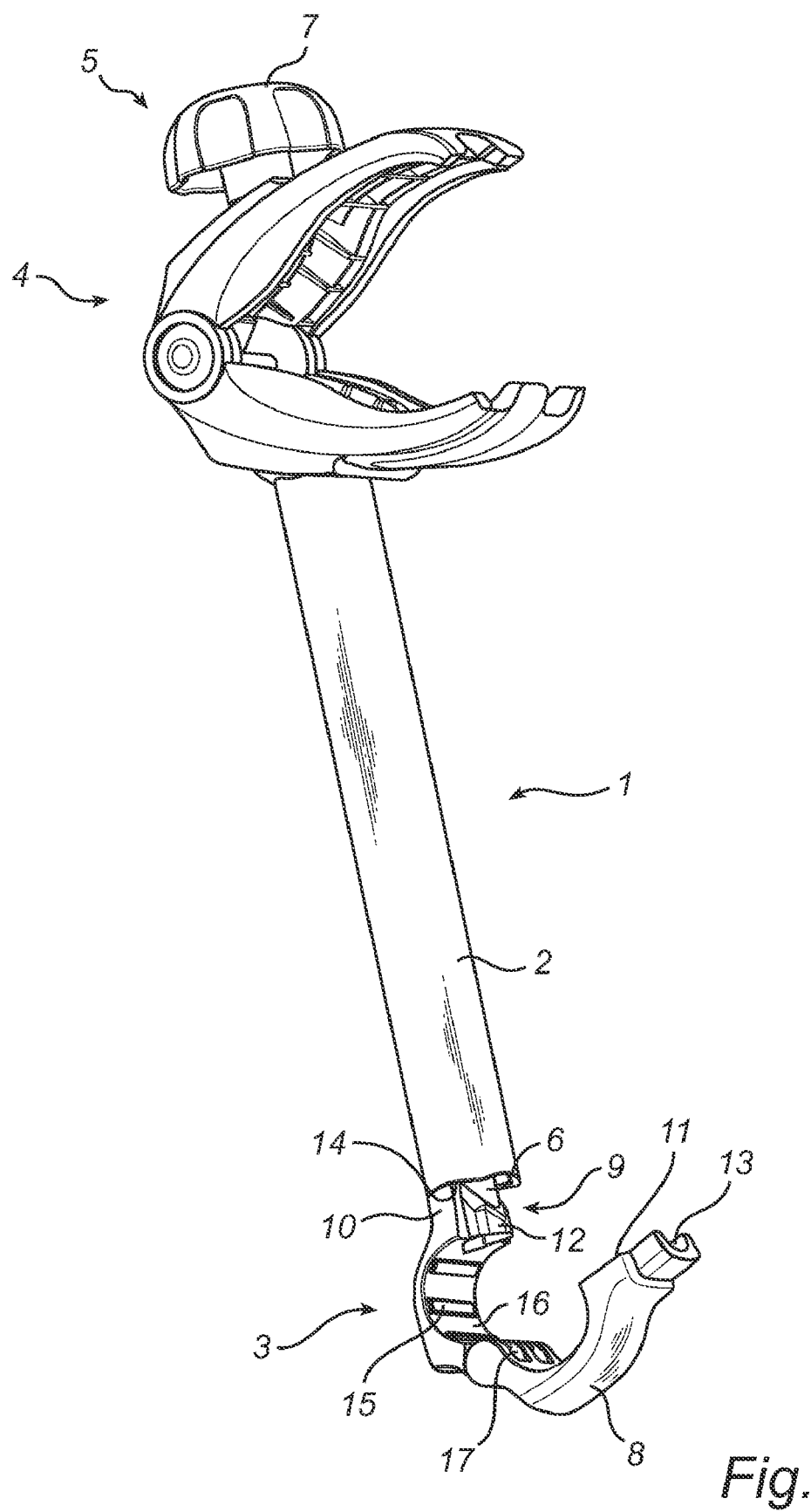
FIG. 1 is a schematic perspective view of a support assembly according to the present invention.

FIG. 1 shows a support assembly 1 for securing a bicycle to a load carrier for vehicles (not shown). The support assembly 1 comprises a bar 2, which is provided at one end with a first gripping means 3 and at the other end with a second gripping means 4 of a kind previously known in the art. The support assembly 1 is adapted for mounting in previously known manner between a substantially fixed frame of the load carrier and a bicycle situated on the load carrier. A common tensioning means 5 forces together said gripping means 3 and 4. The tensioning means 5 comprises a bolt 6 and a lockable knob 7, the bolt 6 being attached to the first gripping means 3 and extending through the bar 2 and the second gripping means 4 to the knob 7. Suitably, the knob 7 is threaded onto the bolt 6 to allow tightening of the tensioning means 5.

The first gripping means 3 comprises an openable annular clamp 8, which is designed to extend substantially completely around the frame of the load carrier and which may initially be mounted in any optional position along the frame and, in a non-tightened state, be moved along the frame. An attachment fitting 9 is fixedly attached to the clamp 8 for attachment to the bolt 6 of the tensioning means 5. The opening of the clamp 8 is situated adjacent said attachment fitting 9 and the clamp 8 has two mutually adapted clamping jaws 10 and 11, which are arranged on either side of the opening and which are moved together during mounting to close said opening upon tightening of the tensioning means 5. By 'opening' is meant the portion of the annular clamp 8 that is opened and not the opening enclosed by the annular clamp 8. Thus, upon tightening of the tensioning means 5 the two clamping jaws 10 and 11 are pressed against one another to tighten the clamp 8 together around the frame.

Suitably, the clamping jaws 10 and 11 have at least one lug 12 or the like, which projects from one clamping jaw 10, and a corresponding recess 13 in the other clamping jaw 11, the clamping jaws 10, 11 being fixed to one another in the direction along the frame.

Preferably, the clamping jaws 10 and 11 project radially from the annular clamp 8 and have a substantially conical outer shape, which is adapted to the cross-section of the bar 2 and intended to be inserted in a corresponding recess 14 in the bar 2 upon tightening of the tensioning means 5. Suitably, the bar 2 consists of a hollow aluminium section and is provided with a plastic sleeve (not shown) featuring said recess 14. Accordingly, the plastic sleeve has a conical shape and, when the clamping jaws 10 and 11 are axially inserted in the bar 2, the shape of the clamping jaws 10 and 11 will cooperate with the recess 14, so that the clamping jaws 10 and 11 are pressed against one another. Because the clamping jaws 10 and 11 project into the bar 2, they will be completely hidden after tightening and cannot be manipulated from the outside in the case of attempted theft.

Suitably, the annular clamp 8 comprises at least one projecting bead 15 or the like, which is provided on its inner surface, said bead 15 abutting the frame upon tightening of the tensioning means 5. Preferably, the clamp 8 has a plurality of such beads 15. Suitably, the clamp 8 comprises a hinge 17 or the like for allowing opening of the clamp 8. Suitably, the clamp 8 is made of a rigid plastic material, but, of course, may also be made of a softer plastic material, which allows a certain deflection of the plastic, in which case said hinge 17 can be left out.

Figure 2A:
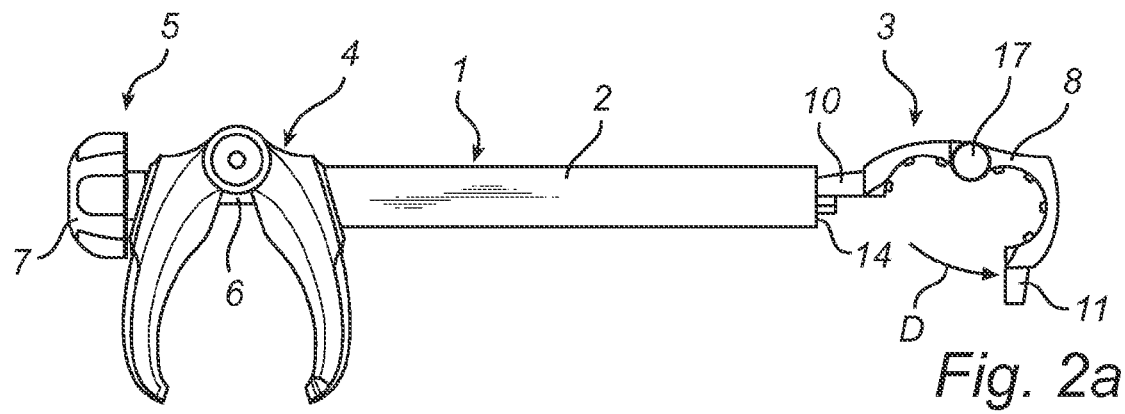
FIG. 2*a* is a schematic side view of said support assembly in the open position.
Figure 2B:
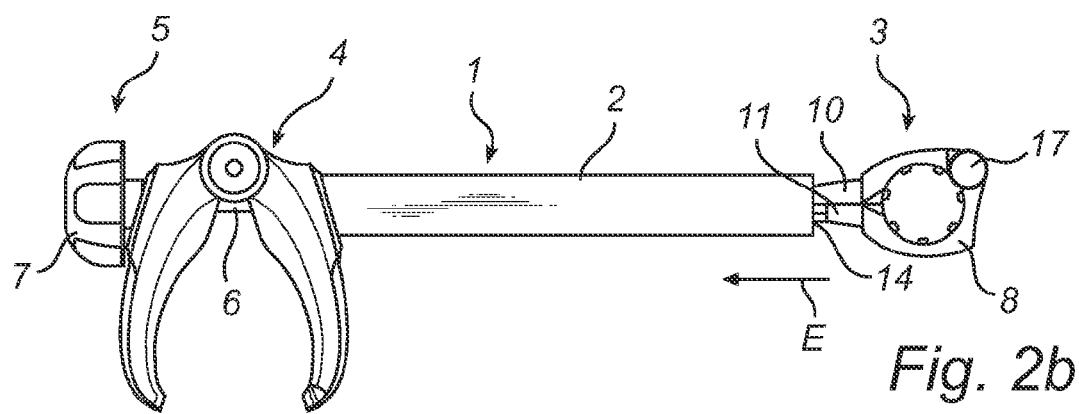
FIG. 2*b* is a schematic side view of said support assembly during tightening.
Figure 2C:
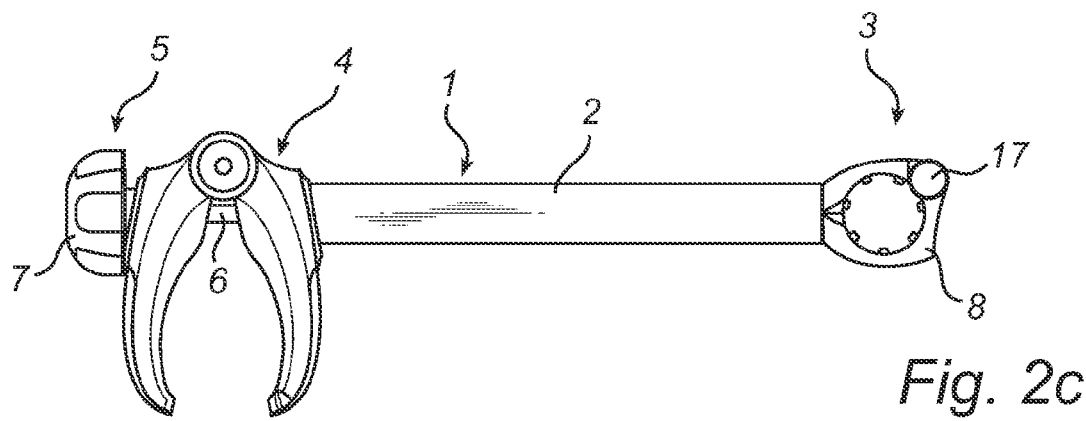
FIG. 2*c* is a schematic side view of said support assembly in the tightened position.

FIGS. 2*a*-2*c* show how the support assembly 1 is mounted. In FIG. 2*a*, the clamp 8 is opened in the direction indicated by the arrow D. The support assembly 1 is then mounted on the frame and the clamp 8 is closed. As shown in FIG. 2*b*, the clamping jaws 10 and 11 are inserted in the bar 2 in the direction indicated by the arrow E. Finally, the tensioning means 5 is tightened, whereby the clamp 8 is moved towards the bar 2, as shown in FIG. 2*c*.

The invention claimed is:

1. A support assembly for securing a bicycle to a load carrier for vehicles, comprising: a bar, which is provided with a first gripping element at a first end and a second gripping element at a second end for mounting the support assembly between a substantially fixed frame of the load carrier and the bicycle; and a tensioning member configured to draw the first gripping element toward the second gripping element when tightened; wherein the first gripping element comprises an openable annular clamp having two mutually adapted clamping jaws extending substantially completely around the frame, and an attachment fitting coupled to the tensioning member and fixedly attached to the clamp, the opening of the clamp being arranged adjacent said attachment fitting, and wherein the two mutually adapted clamping jaws are arranged on either side of the opening and which, upon tightening of the tensioning member, are pressed against one another and a portion of the clamping jaws are inserted into the bar thereby tightening the clamp around the frame.

2. A support assembly according to claim 1, wherein the clamping jaws have at least one lug, which projects from one clamping jaw, and a corresponding recess in the other clamping jaw, the clamping jaws being fixed to one another in the direction along the frame.

3. A support assembly according to claim 2, wherein the clamping jaws project radially from the annular clamp.

4. A support assembly according to claim 3, wherein the clamping jaws have a substantially conical outer shape, which is adapted to the cross-section of the bar and intended to be inserted in a corresponding recess in the bar upon tightening of the tensioning member.

5. A support assembly according to claim 1, wherein the annular clamp comprises at least one projecting bead or the like, which is arranged on its inner surface, said bead abutting the frame upon tightening of the tensioning member.

6. A support assembly according to claim 1, wherein the annular clamp comprises a hinge or the like for allowing the opening of the clamp.

7. A support assembly for securing a bicycle to a load carrier for vehicles, comprising: a bar, which is provided with a first gripping means at a first end and a second gripping means at a second end for mounting the support assembly between a substantially fixed frame of the load carrier and the bicycle; and a common tensioning means configured to draw the first gripping means toward the second gripping means when tightened; wherein the a first gripping means comprises an openable annular clamp, having two mutually adapted clamping jaws extending substantially completely around the frame, and an attachment fitting coupled to the tensioning means and fixedly attached to the clamp, the opening of the clamp being arranged adjacent said attachment fitting; and wherein the two mutually adapted clamping jaws are arranged on either side of the opening and which, upon tightening of the tensioning means, are pressed against one another and a portion of the clamping jaws are inserted into the bar thereby tightening the clamp around the frame.

8. A support assembly for securing a bicycle to a load carrier for vehicles, comprising:
 a bar, which is provided at both ends with a gripping element for mounting the support assembly between a substantially fixed frame of the load carrier and the bicycle; and
 a tensioning member, when tightened, forcing together said gripping element, said gripping element having a first gripping element for attachment to the frame of the load carrier comprising an openable annular clamp, which extends substantially completely around the frame, and an attachment fitting which is fixedly attached to the clamp for attachment to the tensioning member, the opening of the clamp being arranged adjacent said attachment fitting, and that the clamp has two mutually adapted clamping jaws, which are arranged on either side of the opening and which upon tightening of the tensioning member are pressed against one another to tighten the clamp together around the frame,
 wherein the clamping jaws:
  have at least one lug, which projects from one clamping jaw, and a corresponding recess in the other clamping jaw, the clamping jaws being fixed to one another in the direction along the frame;
  project radially from the annular clamp; and
  have a substantially conical outer shape, which is adapted to the cross-section of the bar and intended to be inserted in a corresponding recess in the bar upon tightening of the tensioning member.

* * * * *